United States Patent
Tsirkin

(10) Patent No.: US 12,135,965 B2
(45) Date of Patent: Nov. 5, 2024

(54) PREVENTING DUPLICATE BUILDS BASED ON PRE-COMPUTED CHECKSUMS STORED IN A VERSION CONTROL SYSTEM

(71) Applicant: RED HAT, INC., Raleigh, NC (US)

(72) Inventor: Michael Tsirkin, Yokneam (IL)

(73) Assignee: Red Hat, Inc., Raleigh, NC (US)

( * ) Notice: Subject to any disclaimer, the term of this patent is extended or adjusted under 35 U.S.C. 154(b) by 87 days.

(21) Appl. No.: 17/973,827

(22) Filed: Oct. 26, 2022

(65) Prior Publication Data
US 2024/0143317 A1    May 2, 2024

(51) Int. Cl.
*G06F 8/71* (2018.01)
*G06F 16/14* (2019.01)

(52) U.S. Cl.
CPC .............. *G06F 8/71* (2013.01); *G06F 16/148* (2019.01)

(58) Field of Classification Search
CPC .................................. G06F 8/71; G06F 16/148
See application file for complete search history.

(56) References Cited

U.S. PATENT DOCUMENTS

| | | | |
|---|---|---|---|
| 6,457,170 B1 | 9/2002 | Boehm et al. | |
| 6,880,149 B2* | 4/2005 | Cronce | G06F 21/51 717/124 |
| 6,948,163 B2* | 9/2005 | Melahn | G06F 8/71 707/999.203 |
| 8,863,084 B2 | 10/2014 | Forster et al. | |
| 8,868,796 B1* | 10/2014 | Wojcik | G06F 8/65 710/5 |
| 9,229,693 B1 | 1/2016 | Batni et al. | |
| 9,286,043 B2 | 3/2016 | Jubran et al. | |
| 10,318,256 B2 | 1/2019 | Bruening et al. | |
| 10,409,574 B2* | 9/2019 | Sathyanathan | G06F 8/447 |
| 11,392,366 B1* | 7/2022 | Wiegley | H04L 67/34 |
| 11,431,727 B2* | 8/2022 | Ghiondea | H04L 9/3242 |
| 2005/0165760 A1* | 7/2005 | Seo | G06F 8/71 |
| 2020/0225928 A1* | 7/2020 | Rusev | H04L 67/12 |
| 2022/0391541 A1* | 12/2022 | Novotny | G06F 8/41 |

FOREIGN PATENT DOCUMENTS

| | | | | |
|---|---|---|---|---|
| WO | WO-2015178943 A1 * | 11/2015 | ............. | G06F 17/30 |
| WO | WO-2016122515 A1 * | 8/2016 | | |

\* cited by examiner

*Primary Examiner* — Daxin Wu
(74) *Attorney, Agent, or Firm* — Kilpatrick Townsend & Stockton LLP

(57) ABSTRACT

A computing device can receive, from a version control system, a first set of pre-computed checksums for source files for a software program. The computing device can receive, from the version control system, a second set of pre-computed checksums for a second set of source files for the software program. The computing device can determine a first total checksum by combining the first set of pre-computed checksums. The computing device can also determine a second total checksum by combining the first set of pre-computed checksums. The computing device can determine, by comparing the first total checksum to the second total checksum, that the first set of source files was previously built by the build engine. The computing device can then prevent the build engine from re-building the first set of source files.

19 Claims, 3 Drawing Sheets

PREVENTING DUPLICATE BUILDS BASED ON PRE-COMPUTED CHECKSUMS STORED IN A VERSION CONTROL SYSTEM

TECHNICAL FIELD

The present disclosure relates generally to building software. More specifically, but not by way of limitation, this disclosure relates to preventing duplicate builds based on pre-computed checksums stored in a version control system.

BACKGROUND

Software code can be "built" to generate an executable program, such as a build. The build can be executed by a processor to perform various operations. The software code can include files that can be combined together to generate the build, such as source files, dependency files on which the source files may depend, object files that may be generated from the source files as part of a build process, or any other suitable files.

DETAILED DESCRIPTION

Figure 1:
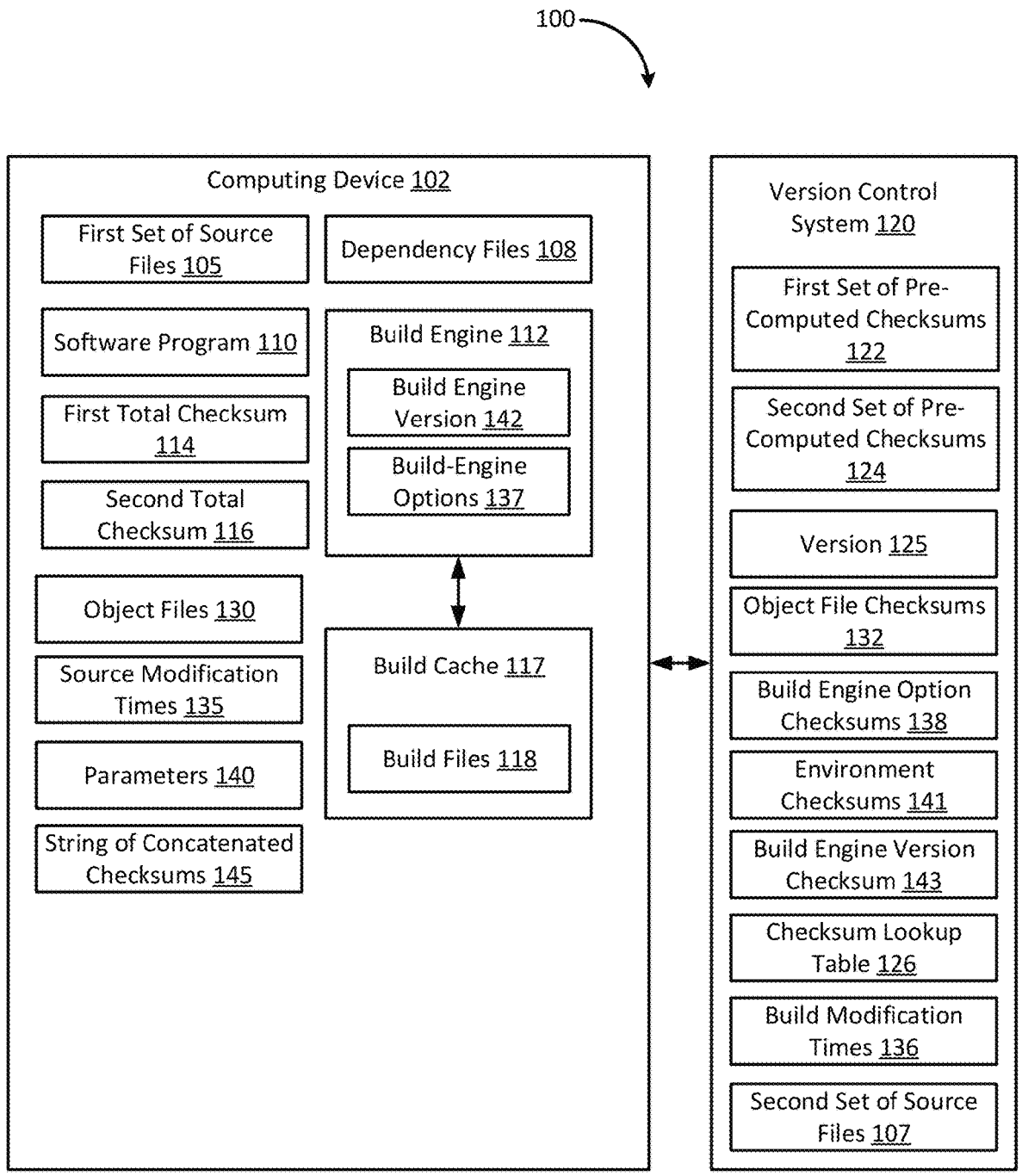
FIG. 1 is a block diagram of an example of a system usable to prevent duplicate builds based on pre-computed checksums stored in a version control system according to some aspects of the present disclosure.

Source files for a software program can be "built" via a build process to generate a piece of executable program code known as a "build". The resulting build can be executed by a processor to perform various operations. The build process can consume a significant amount of time and computing resources. Therefore, it may be desirable to re-use build files that have been previously generated from the source files instead of generating duplicate build files for the same source files. Before the build files are reused, the build files can be validated to ensure that they correspond to the correct source files and to ensure that their integrity is intact. One method for validating the build files can involve reading the source files that were used to generate the existing build files, reading the source files that are to be used to create a new build, and comparing the two sets of source files to determine whether they are the same or different. To perform this comparison, a computing device can compute a checksum or hash associated with each set of source files and compare the checksums to determine whether the source files are the same or different. But, reading both sets of source files and computing their checksums to validate the build files can consume a large amount of time and computing resources.

Some examples of the present disclosure can overcome the aforementioned problems by enabling the computing device to receive a set of pre-computed checksums for the source files from a version control system, which may or may not be remote from the computer device. More specifically, a user may wish to build the source files that are stored on a version control system. The source files can correspond to a version of a software program. To determine whether the existing build files on the computing device correspond to those source files (e.g., to prevent duplicate building of the same source files), the computing device can retrieve pre-computed checksums of the source files from the version control system and use the pre-computed checksums to validate the build files. By using the pre-computed checksums for the source files rather than computing the checksums itself during the build process, the computer device can avoid consuming excessive amounts of computing resources, such as processing time and memory. In some examples, the version control system can execute on a remote computing device that can be better-equipped to pre-compute the checksums. Therefore, enabling the version control system to pre-compute the checksums can decrease an amount of time associated with validating the build files.

In some examples, the computing device can retrieve pre-computed checksums for first and second sets of source files, generate first and second total checksums based on the pre-computed checksums, and use the first and second total checksums to perform the validation operations described above. For example, the computing device can access a first set of source files and a second set of source files. The first set of source files may correspond to the same version or different versions of a software program. The first set of source files may have been previously built by the computing device using a build tool to generate build files. The user may wish to build the second set of source files. To prevent duplicate building of the build files, the computing device can perform a validation process. In particular, the computing device can receive a first set of pre-computed checksums associated with the first set of source files from the version control system, on which the first set of source files may be stored. The computing device can also receive a second set of pre-computed checksums associated with a second set of source files from the version control system, on which the second set of source files may be stored. The computing device can determine a first total checksum by combining the first set of pre-computed checksums for the first set of source files. The computing device can also determine a second total checksum by combining the second set of pre-computed checksums for the second set of source files. The computing device can then compare the first total checksum to the second total checksum to determine whether or not they match. If so, the computing device can prevent the build engine from re-building the source files.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 usable to prevent duplicate builds based on pre-computed checksums stored in a version control system 120 according to some aspects of the present disclosure. The system 100 can include a version control system 120. The version control system 120 can be responsible for managing changes to computer programs. Version control systems can be designed to track and manage changes to software code by developers over time. Some version control system can allow the developers to communicate about the code changes. As developers submit source files (e.g., "commits") to the version control system 120, the version control system

120 may automatically generate a checksum of the source files and store the checksums in a table 126. One popular example of a version control system is GitHub®.

The version control system 120 can include one or more repositories that can store source files and other types of files. The files may be associated with a computer program project, such as a software program. The version control system 120 can enable one or more developers to access, download, and modify the files. The files can be organized such that files corresponding to a particular version 125 of the project are grouped together. The version control system 120 can execute on a computer system can receive and transmit files associated with the project.

The system 100 can also include a computing device 102. A user of the computing device 102 may wish to perform a build of certain source files 105. So, the user may issue one or more commands to a build engine 112 for building the source files 105. During the build process, the computing device 102 (e.g., the build engine) may perform one or more validation operations to avoid building the same source files 105 multiple times to conserve computing resources.

For example, the computing device 102 can receive, from the version control system 120, a first set of pre-computed checksums 122. The first set of pre-computed checksums 122 can correspond to the set of source files 105 that are to be built using the build engine 112 (e.g., to generate a software program or a portion of a software program). The first set of pre-computed checksums 122 can be computed by the version control system 120 as part of a process for tracking and managing code changes associated with the source files 105. The computing device 102 can also receive, from the version control system 120, a second set of pre-computed checksums 124. The second set of pre-computed checksums 124 can correspond to a second set of source files 107 that may have been previously built by the build engine 112 to generate build files 118. In some examples, the build files 118 can be stored in a build cache 117. The build files 118 can be retrieved from the build cache 117. The computing device 102 can then determine a first total checksum 114 by combining the first set of pre-computed checksums 122. In addition to generating the first total checksum 114, the computing device 102 can generate a second total checksum 116. The second total checksum 116 can be generated by combining the second set of pre-computed checksums 124.

In some examples, determining the first total checksum 114 can involve generating a string of concatenated checksums 145. For example, the computing device 102 can concatenate the checksums in the first set of pre-computed checksums 122 to generate the string of concatenated checksums 145. Once the computing device 102 has generated the string of concatenated checksums 145, the computing device 102 can compute the first total checksum 114 based on the string of concatenated checksums 145. For example, the computing device 102 can feed the string of concatenated checksums 145 into a hash function and receive the first total checksum 114 as the output of the hash function. Similarly, the computing device 102 can generate the second total checksum 116 through the same process, using the second set of pre-computed checksums 124 as an input.

In some examples, the first total checksum 114 can additionally or alternatively be generated based on additional checksums, such as checksums of properties of the version control system 120, checksums of other files that may be associated with the source files 105, and/or checksums of parameters of a computing environment associated with the source files 105. For example, the source files 105 may have been developed on or may be compatible with a particular computing environment. The computing environment can include a set of parameters 140, such as environment variables, that can define certain properties of the computing environment. Checksums of the parameters 140 can be computed. Such checksums can be referred to herein as environment checksums 141. The environment checksums 141 can be computed by the version control system 120, and can be stored thereon. The computing device 102 can receive the environment checksums 141 from the version control system 120. The computing device 102 can generate the first total checksum 114 based on the environment checksums 141. For example, the computing device 102 can incorporate the environment checksums 141 into the string of concatenated checksums 145, prior to generating the first total checksum 114. Similar concepts can also be applied to second total checksum 116. For example, the second total checksum 116 can be generated based on environment checksums, which in this context can be checksums of the parameters of whichever computing environment (e.g., on the computing device 102 or another computing device) was used to build the second set of source files 107.

The first total checksum 114 and the second total checksum 116 can additionally or alternatively be computed based on other checksums. For example, the computing device 102 may be running a certain version of the build engine 112. This version can be referred to as the build engine version 142. A checksum of the build engine version 142 can also be computed and stored in the version control system 120. For example, the version control system 120 can compute the build engine version checksum 143. In some examples, the computing device 102 can then retrieve the build engine version checksum 143 from the version control system 120 and generate the first total checksum 114 based on the build engine version checksum 143. A similar process can be applied for whichever version of the build tool was used to build the second total checksum 116.

In some examples, the first total checksum 114 can additionally or alternatively be generated based on build engine option checksums 138. More specifically, the build engine 112 can include a set of build engine options 137. The build engine options 137 can be current settings of the build engine 112. Checksums of the build engine options 137 can be determined (e.g., by the version control system 120) and stored as build engine option checksums 138. The first total checksum 114 can then be computed based on the build engine option checksums 138. A similar process can be applied for whichever options were set for whichever build tool was used to build the second set of source files 107, to produce the second total checksum 116.

In some examples, the first total checksum 114 can additionally or alternatively be generated based on object file checksums 132 that have been computed based on object files 130. The object files 130 may have been generated during a prior build process (e.g., for building the second set of source files 107). The second total checksum 116 may likewise be generated based on the object file checksums 132.

The computing device 102 can compare the first total checksum 114 to the second total checksum 116 to determine whether or not the source files 105 on the computing device 102 were previously built by the build engine 112. In response to determining that the source files 105 were previously built by the build engine 112, the computing device 102 can prevent the build engine 112 from rebuilding the source files 105, thereby preventing a duplicate build process from occurring. For example, the computing device 102 can set a flag associated with the source files 105 that can prevent the duplicate build process from occurring. Alternatively, the computing device 102 can transmit an interrupt to the build engine 112 for preventing the build engine 112 from building the source files 105.

The computing device 102 can also use last modification times 135 associated with the second set of source file 107 to prevent the duplicate build process from occurring. For example, the version control system 120 can store last modification times 136 associated with the second set of source files 107. The last modification times 136 can indicate the time at which the second set of source files 107 were most recently modified. Similarly, the computing device 102 can determine or retrieve last modification times 135 for the build files 118. The last modification times 135 for the build files 118 can indicate the time at which the computing device 102 generated the build files 118. The computing device 102 can compare the last modification times 135 for the first set of source files 105 with the last modification times 136 for build files 118 to determine whether or not the build files 118 have become outdated. If the build files 118 were last modified prior to the first set of source files 105 last modification, it may mean that the build files 118 are outdated. If the computing device 102 determines that the build files 118 are outdated (e.g., the last modification times 136 for the first set of source files 105 are the same as or later in time than the last modification times 135 for the build files 118), then the computing device 102 can allow the build. Otherwise, the computing device 102 may prevent a rebuild of the first set of source files 105.

Figure 2:
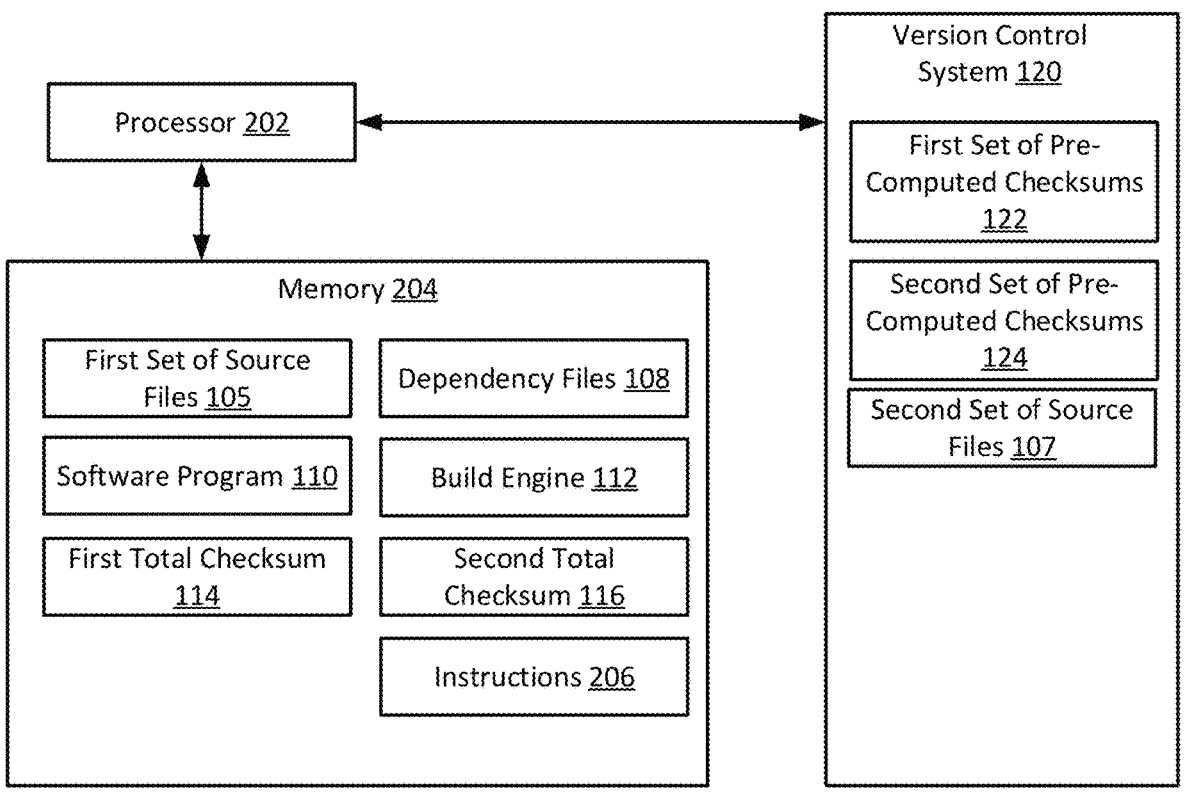
FIG. 2 is a block diagram of an example of a system usable to prevent duplicate builds based on pre-computed checksums stored in a version control system according to some aspects of the present disclosure.

FIG. 2 is a block diagram of an example of a system usable to prevent duplicate builds based on pre-computed checksums stored in according to some aspects of the present disclosure. The system can include a processor 202 coupled to a memory 204. The processor 202 can include one processor or multiple processors. Examples of the processor 202 include a Field-Programmable Gate Array (FPGA), an application-specific integrated circuit (ASIC), or a microprocessor. The processor 202 can execute instructions 206 stored in the memory 204 to perform one or more operations. In some examples, the instructions 206 can include processor-specific instructions generated by a compiler or an interpreter from code written in any suitable computer-programming language, such as C, C++, C #, and Java.

The memory 204 can include one memory device or multiple memory devices. The memory 204 can be volatile or non-volatile, in that the memory 204 can retain stored information when powered off. Examples of the memory 204 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 202 with the instructions 206 or other program code. Non-limiting examples of a computer-readable medium include magnetic disks, memory chips, ROM, random-access memory (RAM), an ASIC, a configured processor, optical storage, or any other medium from which a computer processor can read the instructions 206.

The processor 202 can receive, from the version control system 120, a first set of pre-computed checksums 122. The first set of pre-computed checksums 122 can correspond to a first set of source files 105 to be built by a build engine 112 to generate a software program 110 or a portion of a software program 110. The first set of pre-computed checksums 122 can be computed by the version control system 120 prior to the processor 202 initiating a build process for the first set of source files 105.

The processor 202 can retrieve, from the version control system 120, a second set of pre-computed checksums 124. The second set of pre-computed checksums 124 can be computed based on a second set of source files 107 for the software program 110.

In some examples, the processor 202 can also retrieve dependency files 108, on which the source files 105 may depend. The dependency files 108 may include libraries or other resources that the first set of source files 105 can access in order to perform certain operations. The dependency files 108 can be stored on and retrieved from the version control system 120. The processor 202 can determine a first total checksum 114 by combining the first set of pre-computed checksums 122.

The processor 202 can determine a first total checksum 114 by combining checksums in the first set of pre-computed checksums 122. The processor 202 can also determine a second total checksum 116 by combining checksums in a second set of pre-computed checksums 124. The processor 202 can compare the first total checksum 114 to the second total checksum 116 to determine whether or not the source files 105 in memory 204 have already been built by the build engine 112. In response to determining that substantially the same package of content (e.g., source files, dependencies, object files, etc.) was previously built in a similar computing environment by the build engine 112 using similar build settings, the processor 202 can prevent the build engine 112 from re-building the source files 105.

Figure 3:
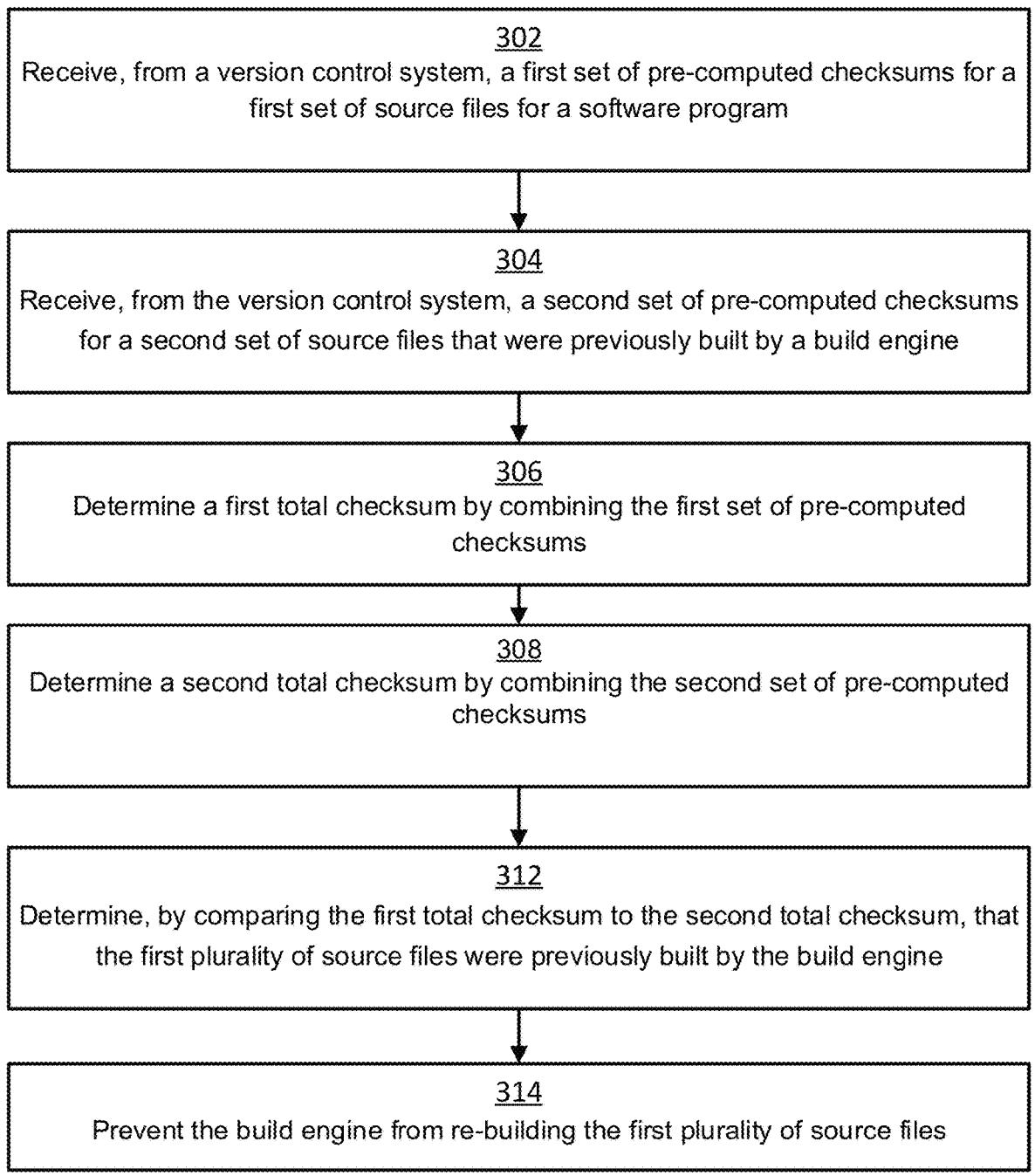
FIG. 3 is a flow chart of a process for preventing duplicate builds based on pre-computed checksums stored in a version control system according to some aspects of the present disclosure.

FIG. 3 is a flow chart of a process for preventing duplicate builds based on pre-computed checksums stored in a version control system according to some aspects of the present disclosure. Other examples may include more operations, fewer operations, different operations, or a different order of operations than is shown in FIG. 3. The operations of FIG. 3 are described below with reference to the components of FIG. 2 above.

At block 302, the processor 202 receives, from a version control system 120, a first set of pre-computed checksums 122 for a set of source files 105 for a software program 110, such as a software application. The processor 202 may be external to the version control system 120 and capable of communicating with the version control system 120 via a network. For example, the processor 202 may be separate and remote from the version control system 120. The version control system 120 can compute the first set of pre-computed checksums 122 by taking the first set of source files 105 and providing them as input to a hash function. The first set of pre-computed checksums 122 can be the output of the hash function.

At block 304, the processor 202 receives, from the version control system 120, a second set of pre-computed checksums 124 for a second set of source files 107 that were previously built by a build engine 112. The second set of source files 107 may be the same or different from the first set of source files 105. The second set of source files 107 may correspond to a set of build files 118, which may have been previously built from the second set of source files 107 via the build engine 112.

At block 306, the processor 202 determines a first total checksum 114 by combining the first set of pre-computed checksums 122. Combining the first total checksum 114 can involve generating a string of concatenated checksums 145 from the first set of pre-computed checksums 122. For example, the computing device 102 can concatenate the checksums from the first set of pre-computed checksums 122 to generate the string of concatenated checksums 145. The computing device 102 can generate the first total checksum 114 based on the string of concatenated checksums 145. For example, the computing device 102 can feed the string of concatenated checksums 145 into a hash function and receive the first total checksum 114 as the output of the hash function.

At block 308, the processor 202 determines a second total checksum 116 based on the second set of pre-computed checksums 124. The version control system 120 can pre-compute the second set of pre-computed checksums 124 based on the second set of source files 107. For example, the version control system 120 can provide the second set of source files 107 as input to a hash function and determine the second set of pre-computed checksums 124 based on the output of the hash function.

At block 310, the processor 202 determines, by comparing the first total checksum 114 to the second total checksum 116, that the first set of source files 105 were previously built by the build engine 112. The processor 202 can store the result of comparing the first total checksum 114 to the second total checksum 116 in a memory 204.

At block 312, in response to determining that the source files 105 were previously built by the build engine 112, the processor 202 can prevent the build engine 112 from re-building the first set of source files 105. Preventing the build engine 112 from re-building the first set of source files 105 can prevent the computing device 102 from consuming computing resources and creating unnecessary network traffic to generate a duplicate set of build files 118.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processor for causing the processor to:
   receive, from a version control system, a first plurality of pre-computed checksums for a first plurality of source files for a software program;
   receive, from the version control system, a second plurality of pre-computed checksums for a second plurality of source files that were previously built by a build engine;
   determine a first total checksum by:
      generating a string of concatenated checksums by concatenating the first plurality of pre-computed checksums; and
      computing a checksum of the string of concatenated checksums, the checksum serving as the first total checksum;
   determine a second total checksum by combining the second plurality of pre-computed checksums;
   determine, by comparing the first total checksum to the second total checksum, that the first plurality of source files were previously built by the build engine; and
   in response to determining that the first plurality of source files was previously built by the build engine, prevent the build engine from re-building the first plurality of source files.

2. The non-transitory computer-readable medium of claim 1, further comprising program code that is executable by the processor for causing the processor to:
   receive, from the version control system, a first plurality of last modification times associated with the first plurality of source files;
   determine a second plurality of last modification times associated with a second plurality of build files generated by building the second plurality of source files;
   compare the first plurality of last modification times to the second plurality of last modification times; and
   in response to determining that the first plurality of last modification times less than the second plurality of last modification times, prevent the build engine from re-building the first plurality of source files.

3. The non-transitory computer-readable medium of claim 1, further comprising program code that is executable by the processor for causing the processor to:
   receive a plurality of environment checksums from the version control system, the plurality of environment checksums being checksums of parameters of a computing environment associated with the first plurality of source files; and
   generate the first total checksum based on the plurality of environment checksums.

4. The non-transitory computer-readable medium of claim 1, further comprising program code that is executable by the processor for causing the processor to:
   receive a build-engine version checksum from the version control system, the build-engine version checksum being a checksum of a version of the build engine; and
   generate the first total checksum based on the build-engine version checksum.

5. The non-transitory computer-readable medium of claim 1, further comprising program code that is executable by the processor for causing the processor to:
   receive a plurality of build-engine option checksums from the version control system, the plurality of build-engine option checksums being checksums of a plurality of options associated with the build engine; and
   generate the first total checksum based on the plurality of build-engine option checksums.

6. The non-transitory computer-readable medium of claim 1, further comprising program code that is executable by the processor for causing the processor to:
   receive a plurality of object-file checksums from the version control system, the plurality of object-file checksums being checksums of object files generated based on the second plurality of source files; and
   generate the first total checksum based on the plurality of object-file checksums.

7. A method comprising:
   receiving, by a processor and from a version control system, a first plurality of pre-computed checksums for a first plurality of source files for a software program;
   receiving, by the processor and from the version control system, a second plurality of pre-computed checksums for a second plurality of source files that were previously built by a build engine;
   determining, by the processor, a first total checksum by:
      generating a string of concatenated checksums by concatenating the first plurality of pre-computed checksums; and computing a checksum of the string of concatenated checksums, the checksum serving as the first total checksum;
determining, by the processor, a second total checksum by combining the second plurality of pre-computed checksums;
determining, by the processor and by comparing the first total checksum to the second total checksum, that the first plurality of source files were previously built by the build engine; and
in response to determining that the first plurality of source files was previously built by the build engine, preventing, by the processor, the build engine from re-building the first plurality of source files.

8. The method of claim 7, further comprising:
receiving, by the processor and from the version control system, a first plurality of last modification times associated with the first plurality of source files;
determining, by the processor, a second plurality of last modification times associated with a plurality of build files generated by building the second plurality of source files;
comparing, by the processor, the first plurality of last modification times to the second plurality of last modification times; and
in response to determining that the first plurality of last modification times are less than the second plurality of last modification times, preventing, by the processor, the build engine from re-building the first plurality of source files.

9. The method of claim 7, further comprising:
receiving, by the processor, a plurality of environment checksums from the version control system, the plurality of environment checksums being checksums of parameters of a computing environment associated with the first plurality of source files; and
generate the first total checksum and the second total checksum based on the plurality of environment checksums.

10. The method of claim 7, further comprising:
receiving, by the processor, a build-engine version checksum from the version control system, the build-engine version checksum being a checksum of a version of the build engine; and
generating, by the processor, the first total checksum and the second total checksum based on the build-engine version checksum.

11. The method of claim 7, further comprising:
receiving, by the processor, a plurality of build-engine option checksums from the version control system, the plurality of build-engine option checksums being checksums of a plurality of options associated with the build engine; and
generating, by the processor, the first total checksum and the second total checksum based on the plurality of build-engine option checksums.

12. The method of claim 7, further comprising:
receiving, by the processor, a plurality of object-file checksums from the version control system, the plurality of object-file checksums being checksums of object files generated based on the second plurality of source files; and
generating, by the processor, the first total checksum and the second total checksum based on the plurality of object-file checksums.

13. A system comprising:
a processor; and
a memory comprising instructions that are executable by the processor for causing the processor to:
receive, from a version control system, a first plurality of pre-computed checksums for a first plurality of source files for a software program;
receive, from the version control system, a second plurality of pre-computed checksums for a second plurality of source files that were previously built by a build engine;
receive an additional checksum from the version control system, the additional checksum including an environment checksum, a build-engine version checksum, a build-engine option checksum, or an object-file checksum;
determine a first total checksum by combining the first plurality of pre-computed checksums and based on the additional checksum;
determine a second total checksum by combining the second plurality of pre-computed checksums;
determine, by comparing the first total checksum to the second total checksum, that the first plurality of source files was previously built by the build engine; and
in response to determining that the first plurality of source files were previously built by the build engine, prevent the build engine from re-building the first plurality of source files.

14. The system of claim 13, wherein the instructions are further executable by the processor for causing the processor to determine the first total checksum by:
generating a string of concatenated checksums by concatenating the first plurality of pre-computed checksums; and
computing a checksum of the string of concatenated checksums, the checksum serving as the first total checksum.

15. The system of claim 13, wherein the instructions are further executable by the processor for causing the processor to:
receive, from the version control system, a first plurality of last modification times associated with the first plurality of source files;
determine a second plurality of last modification times associated with a plurality of build files generated by building the second plurality of source files;
compare the first plurality of last modification times to the second plurality of last modification times; and
in response to determining that the first plurality of last modification times are equal to or greater than the second plurality of last modification times, allow the build engine to re-build the first plurality of source files.

16. The system of claim 13, wherein the additional checksum includes the environment checksum, and wherein the environment checksum is a checksum of a parameter of a computing environment associated with the first plurality of source files.

17. The system of claim 13, wherein the additional checksum includes the build-engine version checksum, and wherein the build-engine version checksum is a checksum of a version of the build engine.

18. The system of claim 13, wherein the additional checksum includes the build-engine option checksum, and wherein the build-engine option checksum is a checksum of an option associated with the build engine.

19. The system of claim 13, wherein the additional checksum includes the object-file checksum, and wherein the object-file checksum is a checksum of an object file generated based on the second plurality of source files.

* * * * *